W. H. TRIMMER.
Grain Drill.
No. 95,619. Patented Oct. 5, 1869.
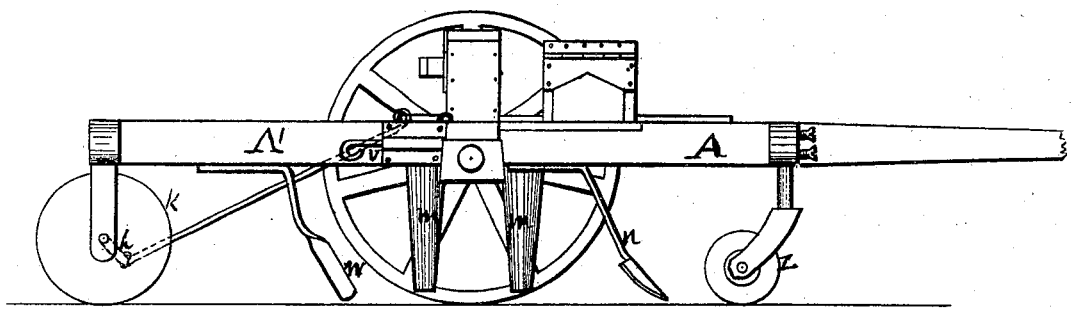
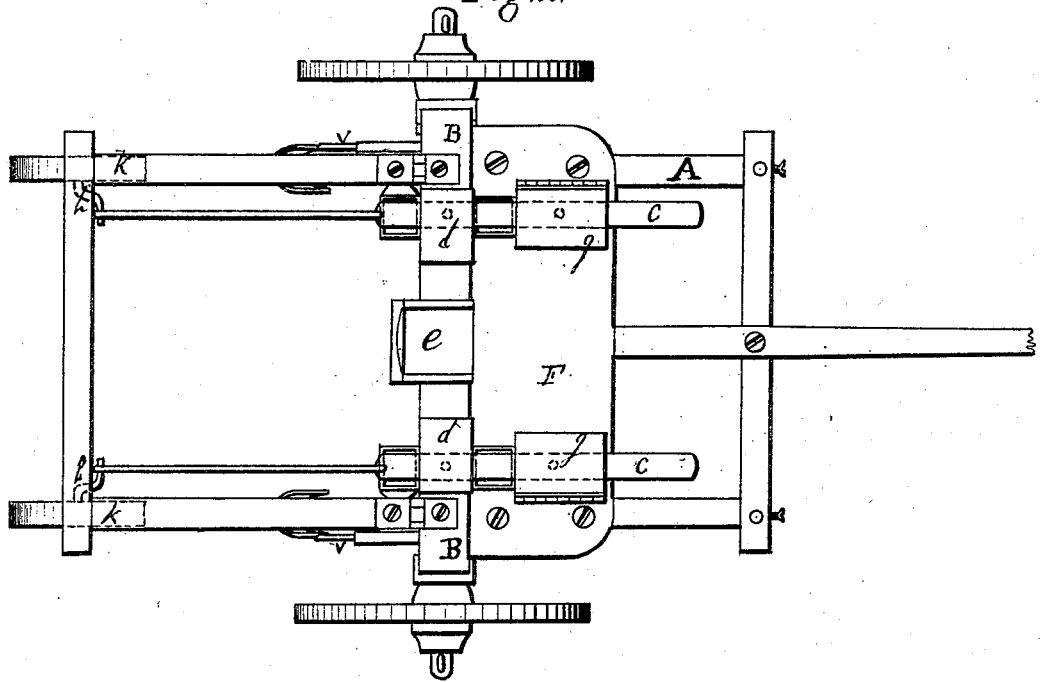
Witnesses
H. N. Miller
John A. Ellis
Inventor
W H Trimmer
Pu
J H Alexander
Atty

United States Patent Office.

WILLIAM H. TRIMMER, OF ROUND HILL, PENNSYLVANIA.

Letters Patent No. 95,619, dated October 5, 1869.

IMPROVED GRAIN-DRILL.

The Schedule referred to in these Letters Patent and making part of the same.

*To all whom it may concern:*

Be it known that I, WILLIAM H. TRIMMER, of Round Hill, in the county of Adams, and State of Pennsylvania, have invented certain new and useful Improvements in Seeding-Machines; and I do hereby declare that the following is a full, clear, and exact description thereof, reference being had to the accompanying drawings, and to the letters of reference marked thereon, which form a part of this specification, in which—

Figure 1 represents a side elevation of my seeder and cultivator.

Figure 2 is a plan view of the same.

The nature of my invention consists in constructing a seeder and cultivator, in the manner hereinafter described.

A A' represent the frame of my machine.

B is the axle-tree, on the upper surface of which are placed the seed-boxes d d and the driver's seat e.

F designates a platform, resting on frame A, directly in front of axle-tree B.

On said platform the two seed-boxes g g are placed.

C C represent slides, operating through slots in the bottom of seed-boxes d d and g g.

The said slides will have as many perforations through them as the operator may deem necessary.

f f represent two iron rods, the inner end of each of said rods being hooked to its corresponding slide C.

The outer end of rods f f will embrace the wrist of crank h.

The cranks h, it will be seen, form one end of the axles, on which driving-wheels k k revolve, the said wheels being hung in pendants at the rear end of frame A'.

L L designate the two front wheels, which are of smaller size, and are constructed and hung like casters, so as to turn on a pivot in any direction.

m m represent tubes for conveying seed to the furrow.

Two of said tubes receive the seed from seed-boxes d d, and two from boxes g g.

n represents the shovel that opens the furrow, and is placed in front of the tubes m.

w represents a bifurcated hoe, secured to frame A', behind the tubes m, and intended to throw the earth from each side to the centre of the furrow, in order to effectually cover the seed.

The rear portion of frame marked A' being hinged to axle-tree B, can be made to play vertically, by removing or withdrawing pins v from their sockets on the sides of frame A.

My seeder, it will be remarked, is designed either for corn or for pumpkin-seed, and this twofold purpose will be effected by placing seed-boxes g g further from boxes d d, and adapting the perforations in slides C C to the increased distance of seed-boxes.

Having thus described my invention,

What I claim, and desire to secure by Letters Patent, is—

1. The hinged frame A', provided with pins v v, wheels k k, and coverers w w, in combination with the main frame A, all arranged to operate substantially as described.

2. A seeder and cultivator, constructed with seed-boxes d d, g g, slides C C, adjustable frame A', wheels k, casters L L, shovels n, forked hoes w, the whole combined and operated substantially as set forth.

In testimony that I claim the foregoing as my own, I affix my signature, in presence of two witnesses.

WM. H. TRIMMER.

Witnesses:
W. W. STEWART,
J. A. R. McBRIDE.